March 18, 1930.  F. WÜST  1,751,185
SMELTING PROCESS
Filed Oct. 18, 1927

Inventor
Fritz Wüst
By Knight Bros.,
Attys.

Patented Mar. 18, 1930

1,751,185

UNITED STATES PATENT OFFICE

FRITZ WÜST, OF DUSSELDORF, GERMANY

SMELTING PROCESS

Application filed October 18, 1927, Serial No. 227,029, and in Germany August 6, 1926.

This invention relates in general to smelting processes and furnaces and more particularly to furnaces for smelting or reducing iron that is poor in carbon.

In the reverberatory furnace described in the German Patent 315,264 it is not possible to increase the content of carbon in the smelted substance. Consequently it is not possible to smelt scrap iron or steel, such as iron chips, filings etc., for casting purposes in this furnace, because the small content of carbon of these substances would render them unfit for casting. Therefore this known furnace can only be used for producing casting iron from pig-iron and waste cast iron.

The object of the present invention is to render the furnace capable of producing casting iron from scrap iron and this is accomplished by arranging an ordinary cupola furnace instead of the usual shaft before the reverberatory furnace and connecting the two furnaces so that the molten substance or metal flows directly from the cupola furnace into the reverberatory furnace, while the hot gases from the reverberatory furnace flow out through the cupola furnace. By this arrangement, in which a considerable amount of the heat required for smelting is supplied by the hot gases that are conducted off from the reverberatory furnace and in which these hot gases also effect the gasification of the coke, it is possible to adjust the quantity of the coke required for smelting, to the exact amount needed for obtaining the desired carbon content in the molten metal. Another possibility of the new arrangement, which is not given in a cupola furnace by itself, is that within certain limits the quantity of coke added can be reduced to any desired amount so that cast iron with a small content of carbon can be produced. This iron is superheated in the reverberatory furnace, in a manner which is known per se, to such an extent that the eutectic graphite formation required to give the iron the best possible mechanical qualities is ensured. The effect of the heat of the hot gases of the reverberatory furnace and cupola furnace is enhanced by causing them to pass through a preheater in which the air of combustion is heated before it passes into the reverberatory furnace.

Figure 1:
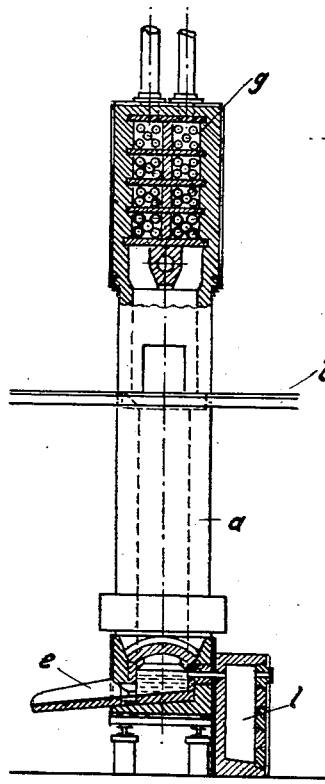
Figure 2:
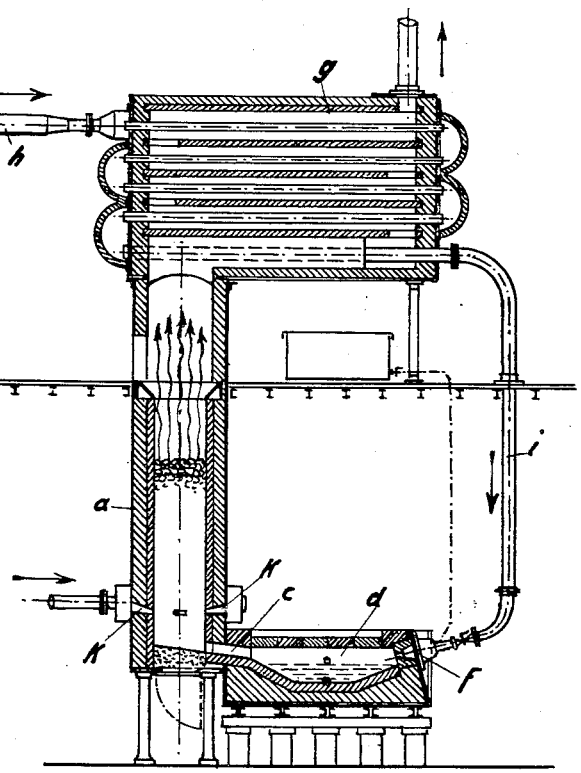
Figure 3:
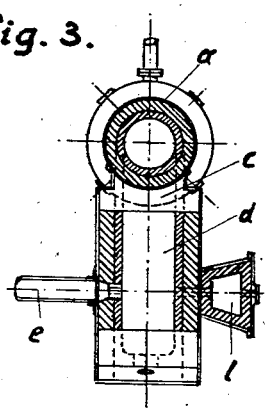
Figure 4:
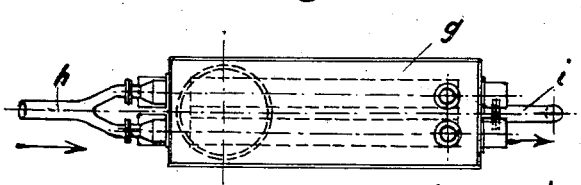

The invention is illustrated by way of example in the drawing in which
Fig. 1 is a vertical transverse section,
Fig. 2 a vertical longitudinal section,
Fig. 3 a horizontal section and
Fig. 4 a top view of the new furnace which consists of a cupola furnace $a$ of an ordinary type into which the metal to be smelted and the addition of coke is introduced from a gallery or the like $b$. The iron which is melted and has its content of carbon increased in this furnace $b$ flows through the channel or conduit $c$ into the reverberatory furnace $d$ in which it is heated to a temperature that is higher than the temperature ordinarily obtained in the cupola furnace. The discharge of the molten iron takes place through the discharge aperture or tap hole $e$. Air and fuel or oil are introduced into the reverberatory furnace at $f$. The hot gases pass through the conduit $c$ into the shaft of the cupola furnace $a$ and thence, together with the gases produced by the combustion of the coke to the preheater $g$, in which the gases from the furnaces and the air, that enters at $h$, flow past each other in separate conduits in opposite directions and the furnace gases impart their heat to the air, which, after it has passed through the preheater is conducted by the pipe $i$ to the reverberatory furnace. The wind or draft required for combustion in the cupola furnace is blown into the same through the wind nozzles $k$. The liquid slag formed during the smelting process is collected in a slag collector $l$ which is situated opposite the metal discharge channel $e$.

I claim:—

1. Method of smelting low carbon cast iron having a definite carbon content in a combined cupola and reverberatory furnace, which consists in melting scrap iron, with carbonaceous material in the cupola furnace by flue gases drawn from the reverberatory furnace and running the melted iron into the reverberatory furnace and subjecting the same to greater heat therein, the carbon content being regulated by measurement of quantity of coke in the cupola furnace.

2. Method according to claim 1 in which the molten iron is superheated in the reverberatory furnace to a sufficient temperature to ensure a fine distribution of the graphite chiefly in eutectic form.

In testimony whereof I have affixed my signature.

FRITZ WÜST.